US009982699B2

(12) United States Patent
Risdale

(10) Patent No.: US 9,982,699 B2
(45) Date of Patent: May 29, 2018

(54) ENERGY ABSORPTION ROTATABLE FASTENER

(71) Applicant: ILLINOIS TOOL WORKS INC., Glenview, IL (US)

(72) Inventor: Marc R. Risdale, Dundas (CA)

(73) Assignee: Illinois Tool Works Inc., Glenview, IL (US)

( * ) Notice: Subject to any disclaimer, the term of this patent is extended or adjusted under 35 U.S.C. 154(b) by 407 days.

(21) Appl. No.: 14/439,683

(22) PCT Filed: Oct. 25, 2013

(86) PCT No.: PCT/US2013/066898
§ 371 (c)(1),
(2) Date: Apr. 30, 2015

(87) PCT Pub. No.: WO2014/078061
PCT Pub. Date: May 22, 2014

(65) Prior Publication Data
US 2015/0292541 A1 Oct. 15, 2015

Related U.S. Application Data
(60) Provisional application No. 61/726,766, filed on Nov. 15, 2012.

(51) Int. Cl.
*F16B 21/00* (2006.01)
*F16B 19/00* (2006.01)
(Continued)

(52) U.S. Cl.
CPC .......... *F16B 19/002* (2013.01); *B60R 21/213* (2013.01); *F16B 21/00* (2013.01); *F16B 21/02* (2013.01)

(58) Field of Classification Search
CPC ........ F16B 19/002; F16B 21/00; F16B 21/02; F16B 21/084; F16B 21/086; B60R 13/0206; B60R 21/213
(Continued)

(56) References Cited

U.S. PATENT DOCUMENTS 3,874,041 A * 4/1975 Smith ................. F16B 5/10
411/555
4,506,419 A * 3/1985 Mitomi ................ F16B 21/02
24/289
(Continued)

FOREIGN PATENT DOCUMENTS

DE 102011100235 A1 11/2012
WO 2010117322 A1 10/2010
WO 2012129471 A2 9/2012

OTHER PUBLICATIONS

ISR and WO for PCT/US2013/066898 dated Feb. 7, 2014.

*Primary Examiner* — Roberta S Delisle
(74) *Attorney, Agent, or Firm* — Joseph M. Butscher; The Small Patent Law Group, LLC

(57) ABSTRACT

An energy absorbing rotatable fastener to attach curtain air bags to a vehicle body includes a metal clip with a rectangular central aperture and inward flanges on opposing sides of the aperture. A molded pin includes a manipulation portion and an energy absorption portion supported on the clip with a biasing element urging the pin outward. The pin and clip connect an air bag tab and body plate and the pin is rotatable in an arc of 45° to place the energy absorption portion in an energy absorbing position between the tab and body plate. The pin and clip each provide energy absorption on air bag deployment. In one form, the manipulation portion of the pin includes a drive cap that provides ninety degrees (90°) of lost motion.

20 Claims, 16 Drawing Sheets

(51) Int. Cl.
*B60R 21/213* (2011.01)
*F16B 21/02* (2006.01)

(58) Field of Classification Search
USPC .................. 411/349, 508, 509, 510, 549
See application file for complete search history.

(56) References Cited

U.S. PATENT DOCUMENTS

| | | | | |
|---|---|---|---|---|
| 4,810,147 A * | 3/1989 | Hirohata | ............... | F16B 21/02 174/138 D |
| 4,952,106 A * | 8/1990 | Kubogochi | ......... | F16B 19/1081 411/48 |
| 5,290,137 A * | 3/1994 | Duffy, Jr. | ............ | F16B 19/1081 411/41 |
| 5,718,549 A * | 2/1998 | Noda | ................... | F16B 5/0635 411/349 |
| 6,435,790 B1 * | 8/2002 | Ichikawa | ............. | F16B 5/0642 24/453 |
| 6,612,795 B2 * | 9/2003 | Kirchen | ................. | F16B 21/02 24/297 |
| 6,955,515 B2 * | 10/2005 | Barina | .................... | F16B 21/02 411/508 |
| 7,178,206 B2 * | 2/2007 | Kuhnle | ............... | B60R 13/0206 24/297 |
| 7,207,758 B2 * | 4/2007 | Leon | ....................... | F16B 21/02 411/45 |
| 7,484,919 B2 * | 2/2009 | Hansen | ............... | F16B 19/1081 411/41 |
| 7,614,836 B2 * | 11/2009 | Mohiuddin | ......... | B60R 13/0206 411/508 |
| 7,740,432 B2 * | 6/2010 | Harada | ................. | F16B 21/065 24/293 |
| 7,753,634 B2 * | 7/2010 | Nakazato | ................ | F16B 5/065 24/663 |
| 7,913,957 B2 * | 3/2011 | Nelson | .................. | F16B 21/02 248/65 |
| 2003/0077144 A1 * | 4/2003 | Perrot | ................... | F16B 5/0628 411/349 |
| 2011/0262243 A1 * | 10/2011 | Glickman | ............... | F16B 21/02 411/337 |
| 2012/0039687 A1 | 2/2012 | Ostergren | | |
| 2012/0074278 A1 * | 3/2012 | Hamaguchi | ............ | B60N 3/023 248/221.11 |
| 2014/0017036 A1 | 1/2014 | Everard | | |
| 2014/0109357 A1 | 4/2014 | Fischer | | |

* cited by examiner

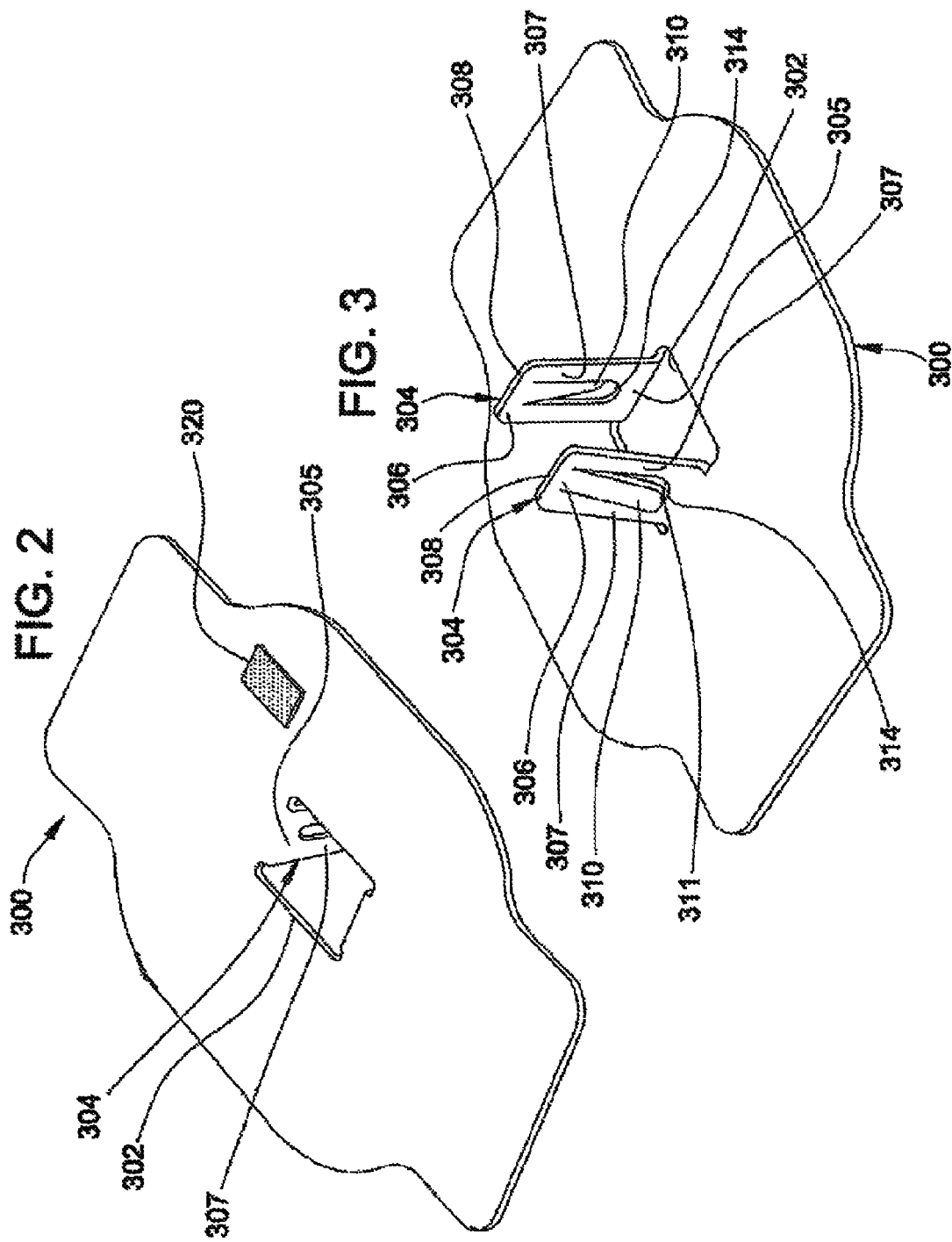

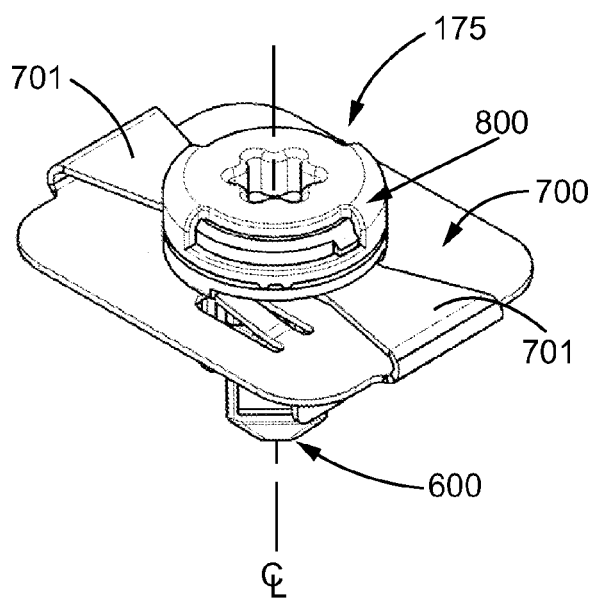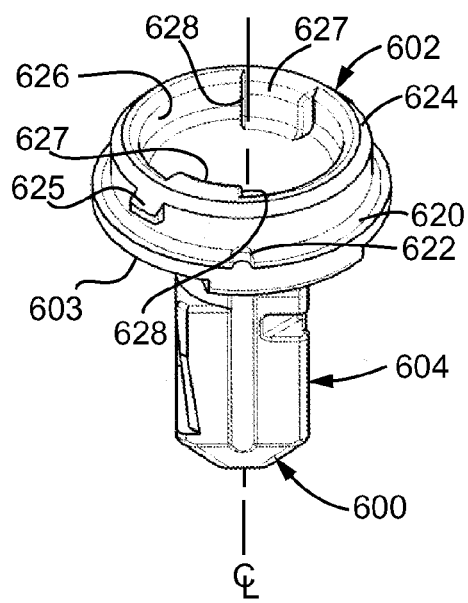
FIG. 19  FIG. 20
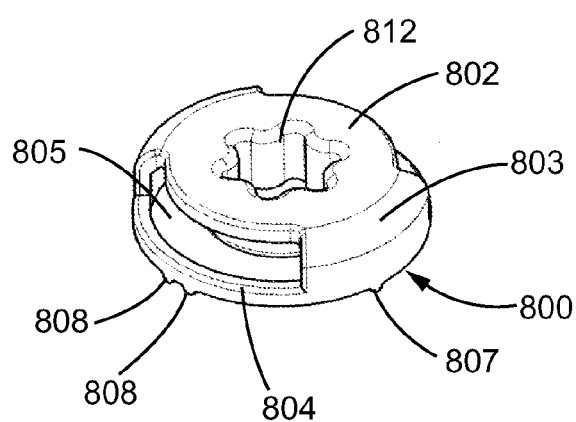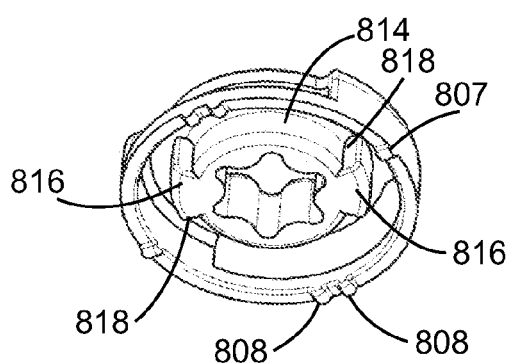
FIG. 21  FIG. 22

ENERGY ABSORPTION ROTATABLE FASTENER

CROSS REFERENCE TO RELATED APPLICATIONS

This application is a National Phase of International Application Number PCT/US2013/066898 filed Oct. 25, 2013 and claims priority to U.S. Provisional Application Ser. No. 61/726,766, filed Nov. 15, 2012.

BACKGROUND

This disclosure relates to energy absorbing rotatable fasteners. More particularly, it relates to such fasteners suitable for use in the installation of curtain air bags in automotive vehicles.

Recent developments of fasteners for affixation of a curtain airbag to a vehicle frame have included devices with the capability of energy absorption to protect the vehicle structure during deployment. Also evolving, are devices, rotatable after insertion, to affix the fastener, and consequently the curtain air bag structure, into place. Examples of such devices are disclosed in PCT Publications WO2010/117322 A1 and WO2012/129471 A2, the entire contents of the specification and drawings of which are hereby incorporated by reference as if fully set forth herein.

The foregoing examples of rotatable fasteners have desirable features significantly advancing the installation and utilization of curtain air bags. Further evolution has resulted in the fasteners of the current disclosure which provide additional features and advantages.

More particularly, the fasteners of this disclosure are usable with mounting configurations already present in certain vehicle designs. The fasteners are capable of pre-assembly to a curtain air bag sub-assembly for delivery to, and installation by, an original equipment manufacturer. Completion of securement at installation requires only a forty-five degree (45°) rotation, minimizing assembly time. The fasteners are also suitable, in a modified form, for installation using powered hand tools. Moreover, these fasteners embody energy absorbing capability to maximize structural integrity of the vehicle into which the curtain airbag is installed.

These and other advantages derive from the fastener of the present disclosure which comprises an energy absorbing rotatable fastener to attach curtain air bags to a vehicle body includes a metal clip with a rectangular central aperture and inward flanges on opposing sides of the aperture. A molded pin includes a manipulation portion and an energy absorbing portion supported on the clip with a biasing element urging the pin outward. The pin and clip connect an air bag tab and body plate and the pin is rotatable in an arc of 45° to lock the tab to the body plate in an energy absorbing relation between the tab and body plate. The pin and clip each provide energy absorption on air bag deployment. In one form the pin includes a cap that provides ninety degrees (90°) of lost motion.

DESCRIPTION OF THE DRAWINGS

FIG. 2 is a perspective, front view, of the clip component of the energy absorbing rotatable fastener of FIG. 1.

FIG. 3 is a perspective, back view, of the clip component of the energy absorbing rotatable fastener of FIG. 1.

FIG. 19 is a fragmentary perspective view of a further modified form of energy absorbing rotatable fastener in accordance with the present disclosure.

FIG. 20 is a perspective view of the pin component of the energy absorbing rotatable fastener of FIG. 19.

FIG. 21 is a perspective view of a rotatable cap component of the energy absorbing rotatable fastener of FIG. 19.

FIG. 22 is a further perspective view of the cap component of the energy absorbing rotatable fastener of FIG. 19 from a different view point.

DETAILED DESCRIPTION OF THE ILLUSTRATED EMBODIMENTS

Figure 1:
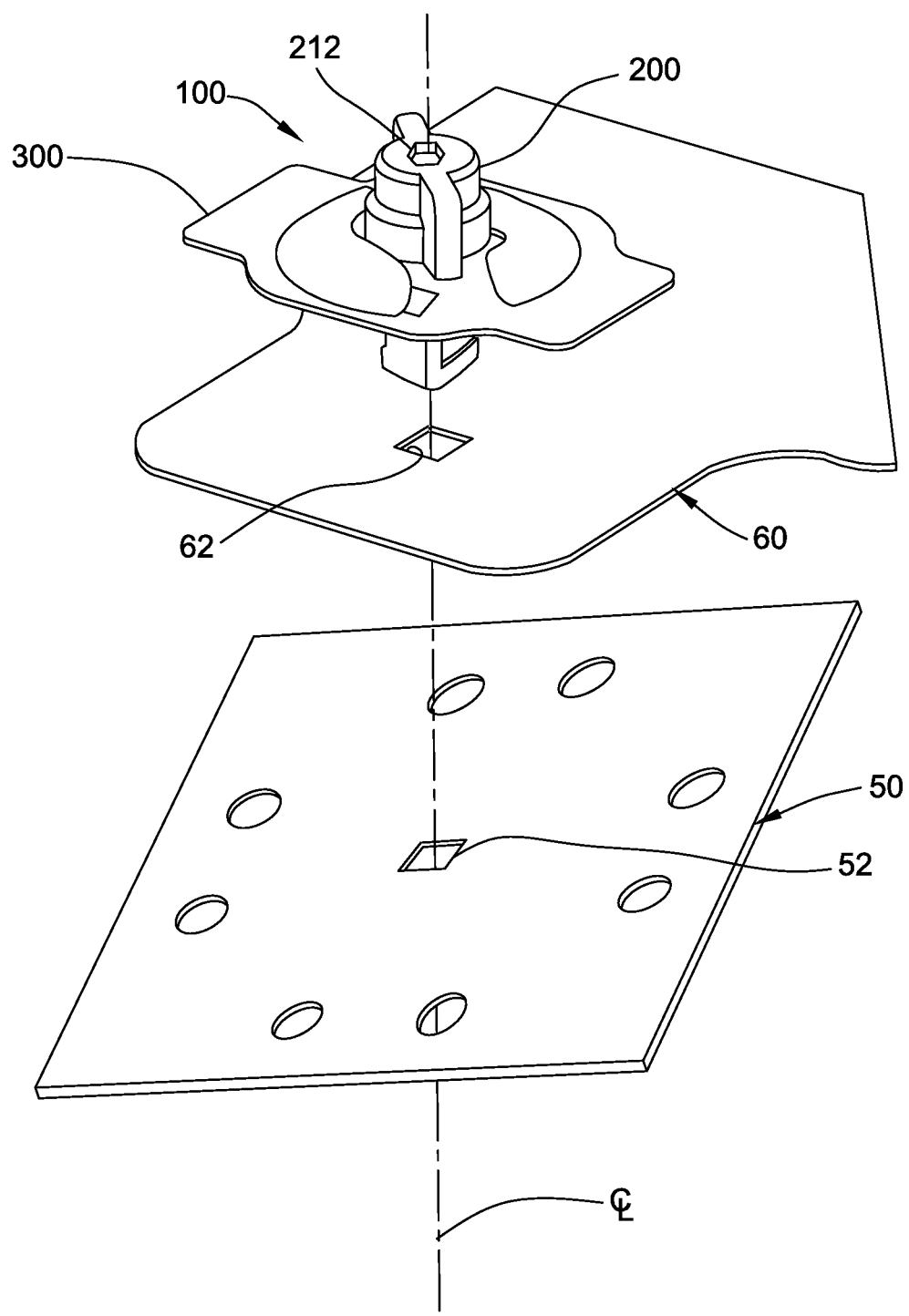
FIG. 1 is an exploded view illustrating the installation of a curtain air bag to a vehicle using an energy absorbing rotatable fastener of the present disclosure.

Referring to the accompanying drawings, fastener 100 of the present disclosure is useful to affix tabs of a curtain air bag to the frame of a vehicle. The vehicle frame includes a plurality of spaced structural steel body plates 50, one of which is shown in FIG. 1. Each body plate 50 is provided with a rectangular body plate aperture 52. The body plates 50 are mounted to the frame with a void space behind the plate to accommodate the fastener. Such body plates are in current use by certain vehicle manufacturers.

The curtain air bag includes a plurality of structural steel hanger plates or tabs 60, each with a rectangular tab aperture 62 sized similarly to the aperture 52 of body plates 50. The fastener 100 is insertable longitudinally through the tab aperture 62 and body aperture 52 along a longitudinal axis of movement CL shown in FIG. 1. After such insertion, the fastener 100 is rotated through an arc of forty-five degrees (45°) to affix the fastener and associated curtain air bag tab in place and operatively position the energy absorption elements of the fastener 100. On deployment of the curtain air bag, the energy absorption characteristic of the fastener minimizes the forces imparted to the vehicle frame.

In the context of this description and accompanying drawings, the front, or top of a component is visible to a viewer when the component is in the installed position. The back or bottom is not visible. The term longitudinal means along the longitudinal axis CL of insertion. Longitudinally inner, inward, or inboard means in the direction of insertion. Longitudinally outer, outward or outboard means in the opposite direction. Lateral, or transverse, means in a plane perpendicular to the longitudinal axis of insertion. Laterally inward means in a direction toward the longitudinal axis of insertion and laterally outward means in a direction away from the longitudinal axis of insertion.

Figure 4:
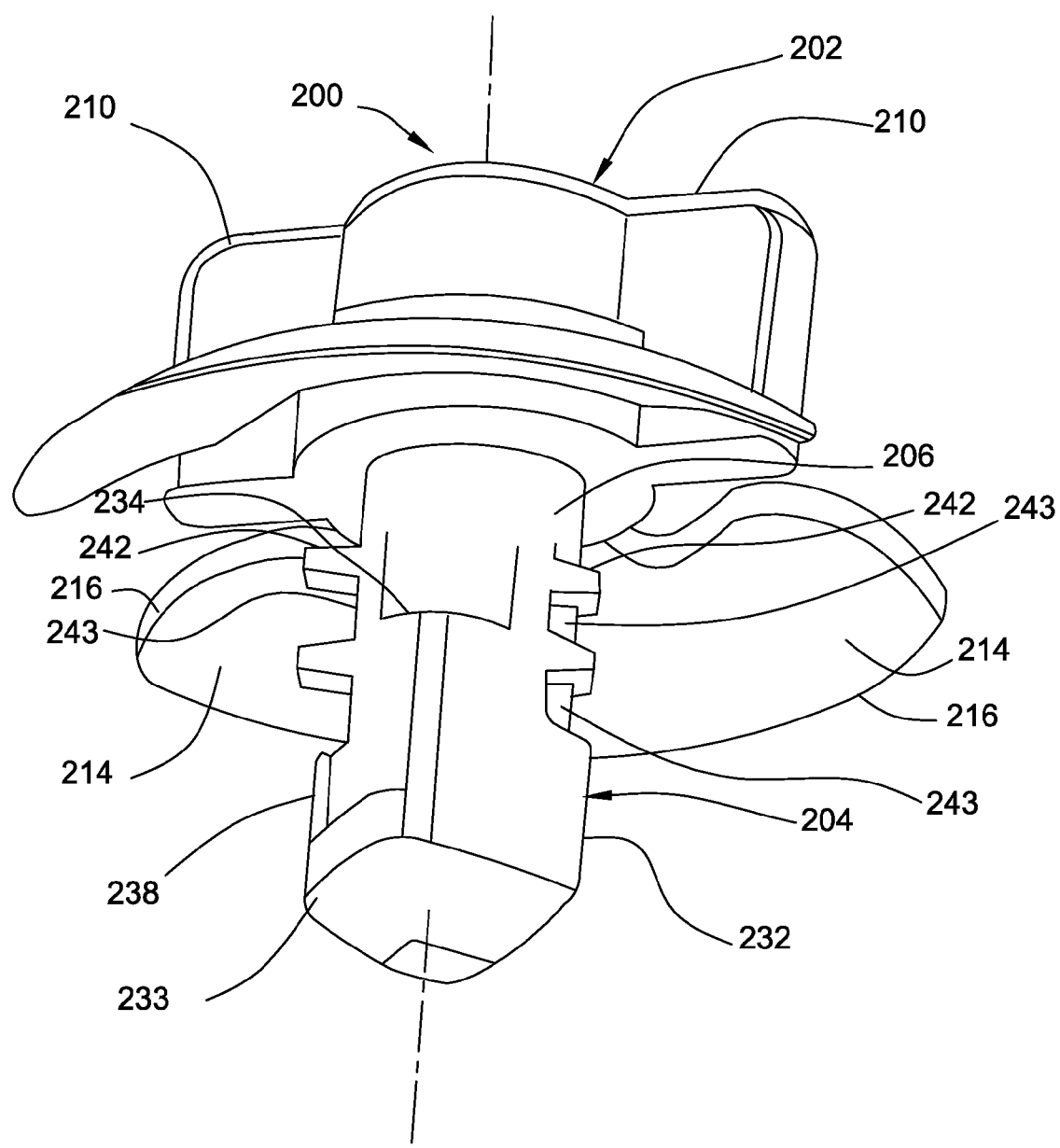
FIG. 4 is a perspective view of the pin component of the energy absorbing rotatable fastener of FIG. 1 viewed from its energy absorption portion.
Figure 5:
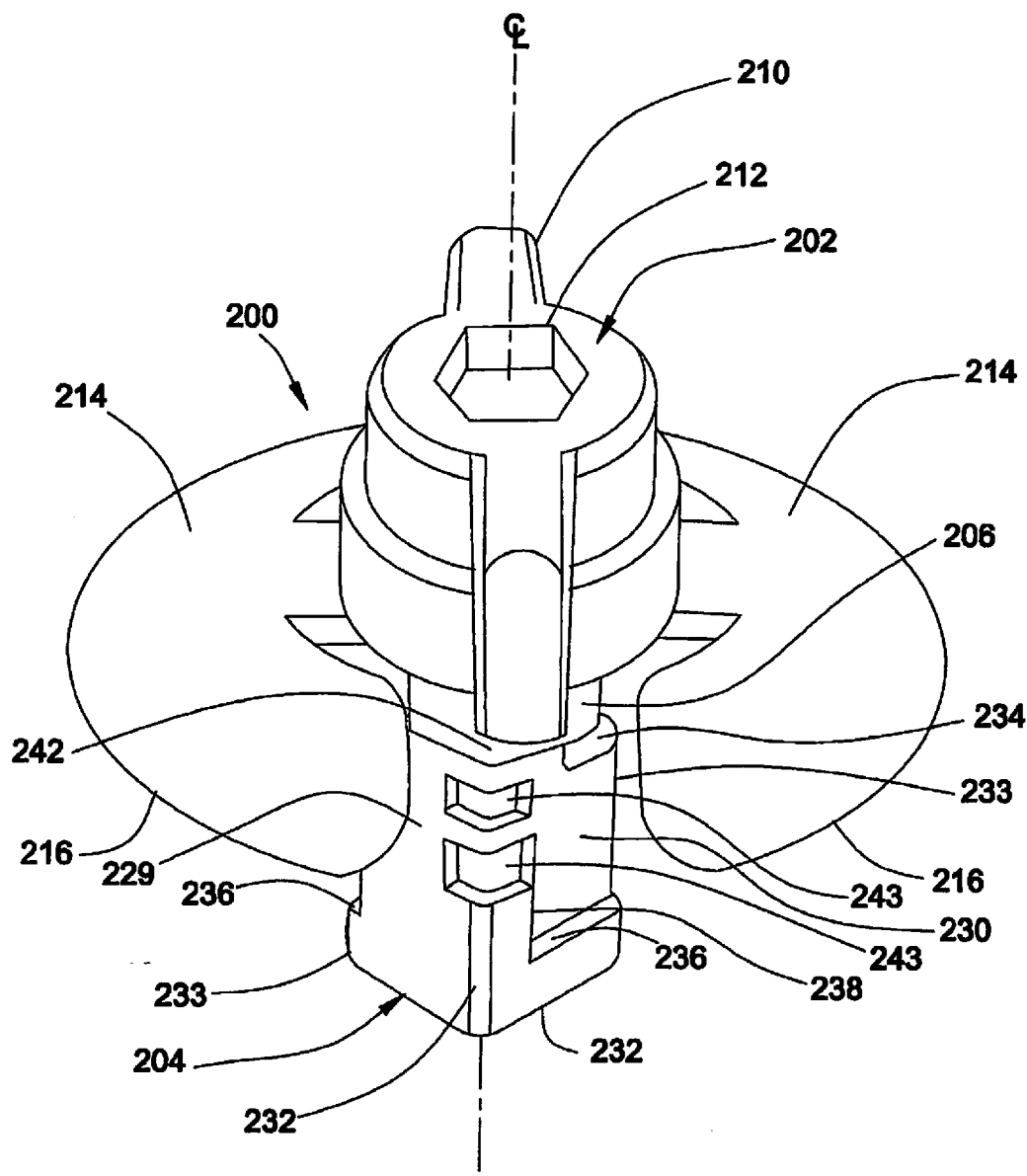
FIG. 5 is a perspective view of the pin component of the energy absorbing rotatable fastener of FIG. 1 viewed from its head, or manipulation, portion.
Figure 6:
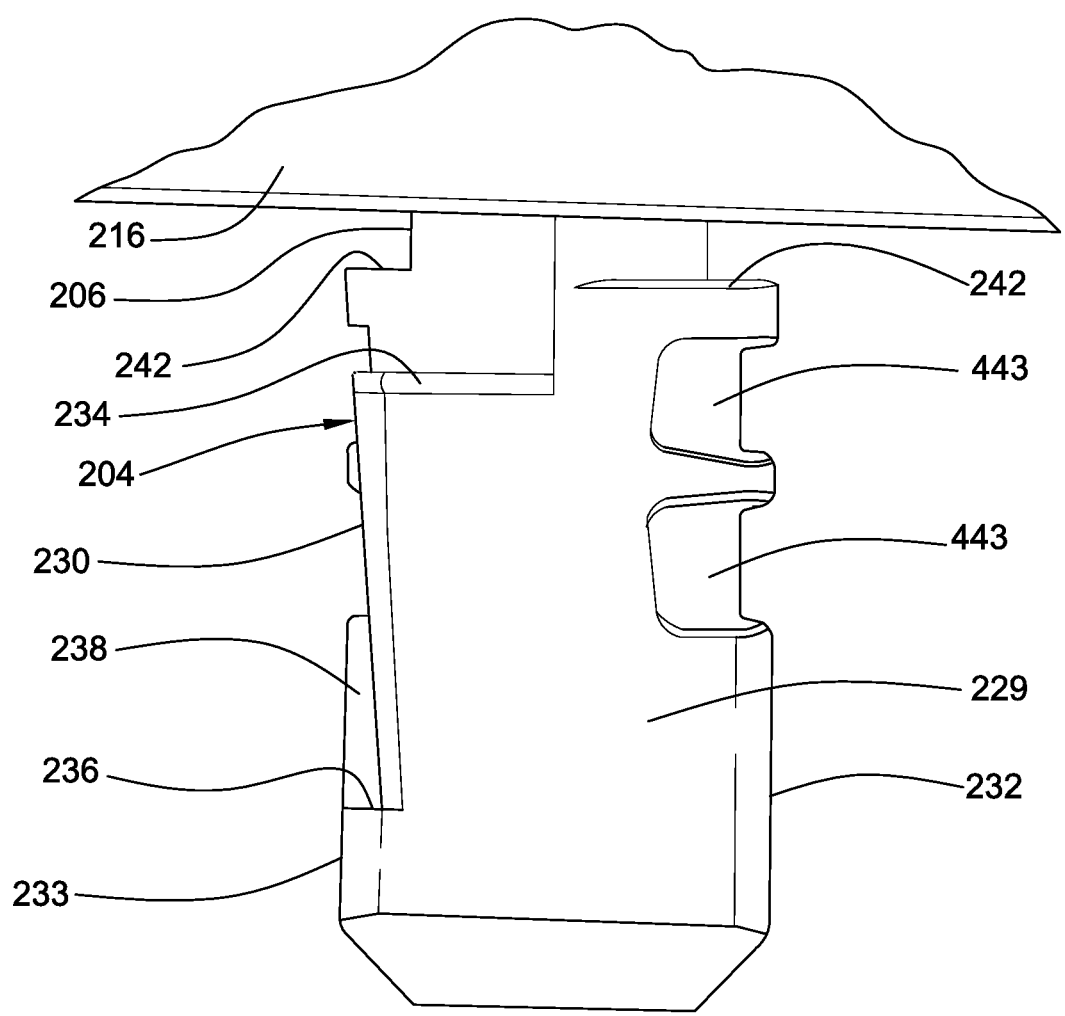
FIG. 6 is a partial, side view, of the energy absorption portion of the energy absorbing rotatable fastener of FIG. 1.

The fastener 100 is comprised of two components, a clip 300 shown in a front view in FIG. 2 and a back view in FIG. 3, and a pin 200, shown in perspective views in FIGS. 4 and 5 and a plan view in FIG. 6. These components are pre-assembled to form the unitary fastener 100 shown in FIG. 1 and in a partial view in FIG. 8.

Figure 8:
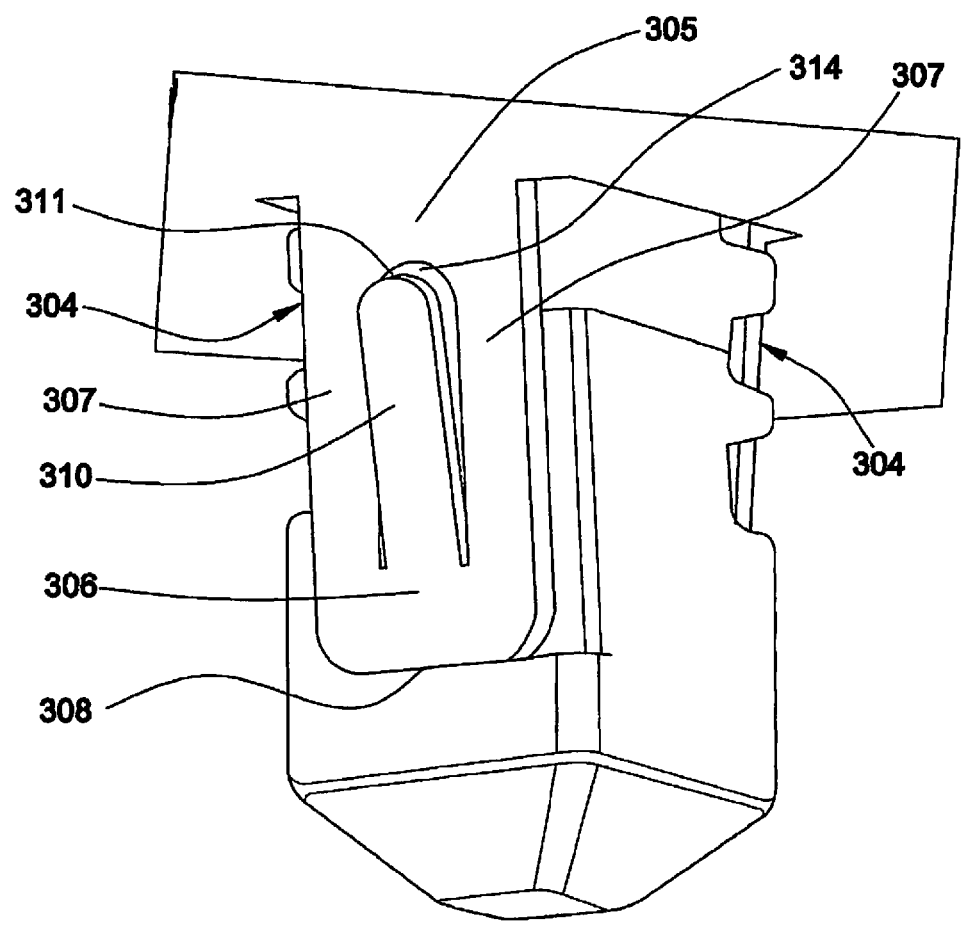
FIG. 8 is a partial, perspective view, of the assembled components of the energy absorbing rotatable fastener of FIG. 1.

The clip 300 seen in FIGS. 2 and 3 is a thin metal plate having a flat planar outward surface with a rectangular clip aperture 302. As best seen in FIG. 8 opposite edges of the clip aperture 302 are provided with inwardly extending longitudinal flanges 304, each having a proximal wall portion 305 and a distal wall portion 306 connected by longitudinal legs 307. Distal wall portion 306 has an inward transverse edge 308. As seen in FIG. 3, the flanges 304 converge transversely inwardly, toward each other.

Longitudinal central fingers 310 having an outward transverse edge or contact surface 311 are cantilevered from distal wall portions 306. These fingers diverge outwardly to an unstressed disposition that places transverse edges 311 wider apart than the width of aperture 62 in tab 60 and aperture 52 in body plate 50. Edges of legs 307 and fingers 310 define open captive areas having an outward terminus at transverse edges 314 of proximal wall portions 305.

Referring to FIGS. 4 and 5, the pin 200 is longitudinally elongate along a central axis CL. It is comprised of a structural metal core 270, seen in FIG. 7 and an overmolded exterior polymeric body.

The pin 200 is a unitary molded structure with portions having separate functions. It includes a head or manipulation portion 202, an energy absorption portion 204 and a transition portion 206 connecting head portion 202 and energy absorption portion 204.

The head portion 202 is larger than the rectangular apertures in clip 300, body plate 50 and tab 60. It includes manual grasp flanges 210 for longitudinal insertion and rotational movement of the fastener 100 during attachment of a curtain airbag to a vehicle. It further includes a tool drive receptacle 212 which is illustrated as a hexagonal socket. It, of course, could take any desired form to receive a manual, or powered drive tool.

Head portion 202 includes laterally extending opposed biasing webs 214 which are cantilevered biasing spring elements. During insertion of the pin 200 into rectangular apertures 62 and 52 of clip 60 and body plate 50, peripheral edges of the webs 214 contact the outboard or front planar surface of clip 300. Insertion of pin 200 inwardly, along axis CL deforms the biasing webs to impart a restoring force to urge the pin longitudinally outward. This force is utilized to retain the pin 200 and clip 300 assembled in its position as will be further explained.

The laterally extending biasing webs 214 have an arcuate peripheral edge 216. As seen in FIGS. 1 and 2, clip 300 may include machine readable indicia 320 on its front surface, which, in the insertion position of pin 200, is partially obscured by one of the webs 214. It is completely exposed for recognition by an optical reader only when the pin 200 of fastener 100 is rotated to its energy absorption position. Verification of the installation of each fastener and completion of the attachment process during assembly of vehicle is thereby accomplished.

Transition portion 206 is generally cylindrical, and sized to rotate within the aperture 62 of tab 60, aperture 52 of body plate 50 and aperture 302 of clip 300. It permits rotation of the pin 200 to its operative position, securing tab 60 to body plate 50 and providing energy absorption capability.

The energy absorption portion 204 of pin 200 is best seen in FIGS. 5 and 6. It is of generally square cross-section with two oppositely facing walls 229 and two oppositely facing walls 230 joined at diagonally opposed corners 232 and 233. Corners 232 include a series of spaced notches 243 which define a longitudinal energy absorbing structure commencing at an outward planar transverse surface 242 at each corner 232. Corners 233 are actuating corners and terminate at planar transverse surfaces 234 extending transversely to cylindrical transition portion 206.

The two oppositely facing walls 229 are generally planar. The two opposed side walls 230 include recesses to create transverse support ledges 236 and longitudinal stop edges 238 adjacent opposite corners 232. Pin 200 is positioned in clip aperture 302 with opposed side walls 230 aligned with and facing the opposed flanges 304.

Planar transverse walls 234 at corners 233 extend transversely inward to cylindrical transition portion 206. On rotation of the pin 200 to its energy absorption position, planar transverse walls 234 are disposed in abutting relation to the transverse edges 314 of proximal walls 305 of longitudinal flanges 304 of clip 300 as will be discussed further.

When pin 200 is rotated to its energy absorption position, outward planar transverse surfaces 242 are disposed in abutting relation to inward surface or back of body plate 50. The longitudinal energy absorbing structures comprise the initial energy absorbing element of the fastener in the event of deployment of the curtain airbag.

The structural metal core 270 of pin 200 is configured to retain the curtain air bag to the vehicle frame under conditions of air bag deployment. The forces associated with such deployment are dissipated by the energy absorption portion 204. However, it is important that the curtain air bag structure be retained to the vehicle body frame which is assured by the internal structural metal core 270.

Figure 7:
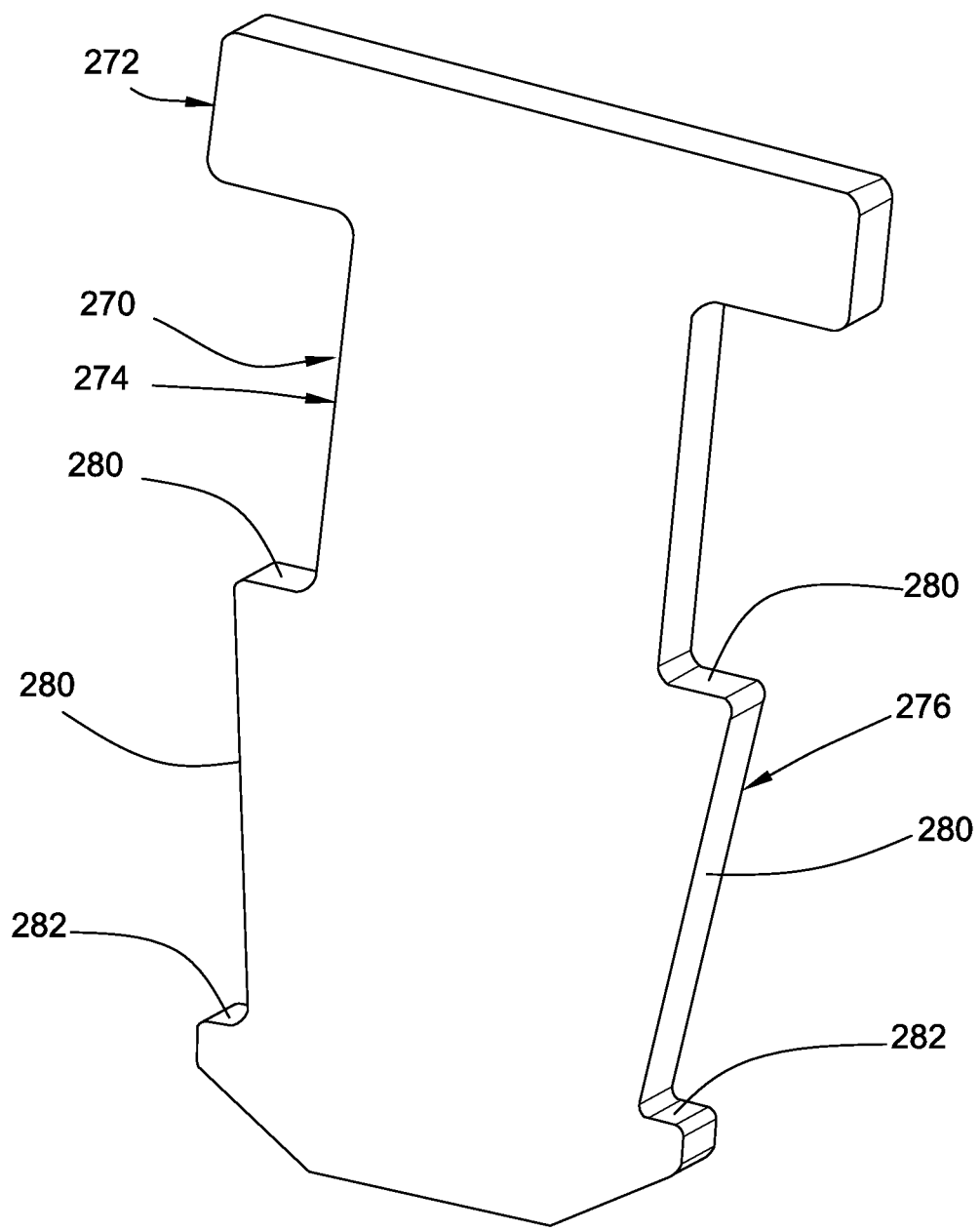
FIG. 7 is a perspective view of the structural metal core of the energy absorbing rotatable fastener of FIG. 1.

Referring to FIG. 7, structural metal core 270 has a head end portion 272, a central portion 274 and a retention portion 276. It is made of stamped steel, with sufficient strength to withstand the forces associated with deployment of the curtain air bag. It may, of course be made of other materials, by other manufacturing processes.

Figure 9:
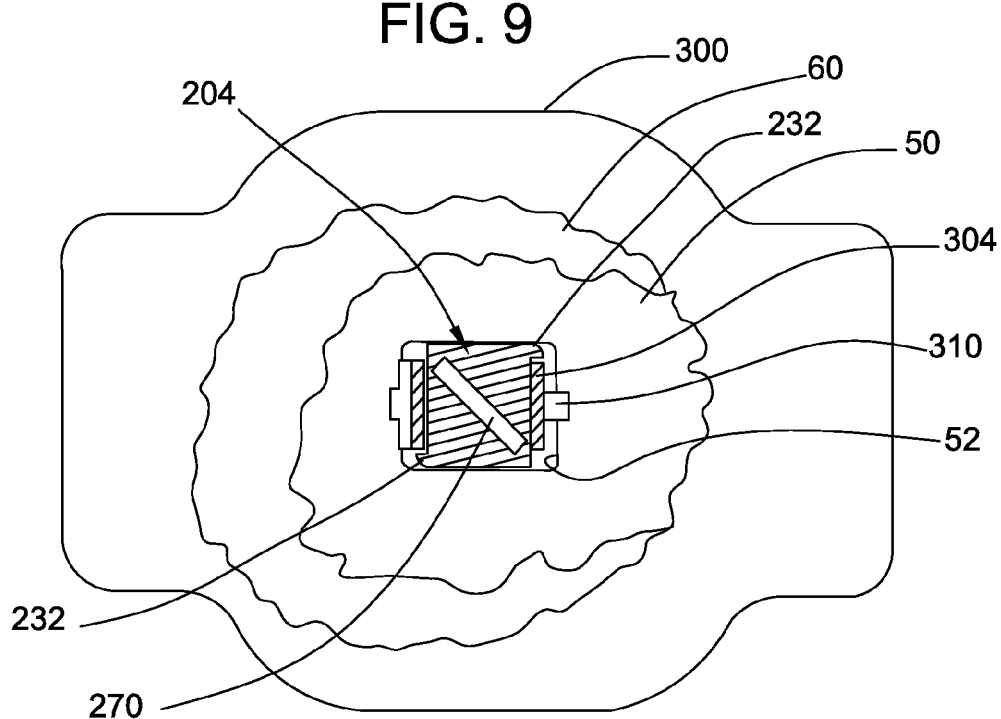
FIG. 9 is a bottom view, partially in section, of the rotatable energy absorbing fastener of FIG. 1 inserted into components to be connected.
Figure 10:
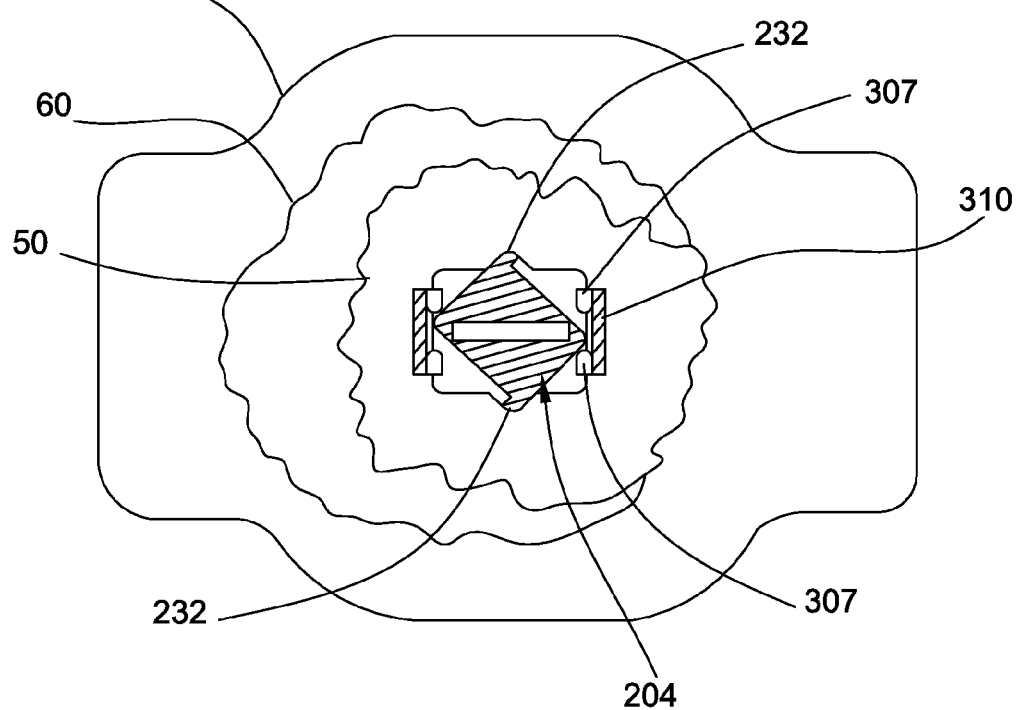
FIG. 10 is a bottom view, partially in section, showing the energy absorbing rotatable fastener of FIG. 1 in its rotated position.

As seen in FIGS. 9 and 10, structural metal core 270 is molded diagonally within the pin body between corners 233 of energy absorption portion 204. The transverse width of structural metal core 270 is, therefore, larger than the length of the long side edges of the rectangular apertures 302, 62 and 52. This angular disposition of the structural metal core 270 provides for the maximum core size for a given size insertion aperture.

The head end portion 272 of structural metal core 270 has a transverse extent wider than the width of the aperture 62 of tab 60. Therefore, on insertion of the pin 200 into aperture 62 of tab 60, the tab 60 is captured against removal from the pin 200 in the outward direction.

The retention portion 276 of structural metal core 270 defines abutment ledges 280 underlying planar transverse walls 234. Ledges 280 are spaced part a distance greater than the width of rectangular aperture 52 of body plate 50 in any direction. Thus, when the pin 200 is rotated to its energy absorption position, the ledges 280 are captured against withdrawal in an outward direction.

The shape of the retention portion 274 is such that it defines hook-like feet 282 at the inward end of structural metal core 270. Hook-like feet 282 reside in the inwardmost end of molded corners 233 further embedding the structural metal core 270 within the energy absorbing portion 204. The hook-like feet 282 are spaced apart similarly to the abutment ledges 280, and on rotation of the pin 200 to its energy absorption position, are captured against withdrawal in the outward direction.

The head end portion 272 and retention portion 276 are connected by central portion 276 which extends through transition portion 206 of pin 200.

The pin 200 and clip 300 are preassembled to form completed fastener 100 seen in FIG. 1. Energy absorption portion 204 is inserted longitudinally through clip aperture 302. Such insertion laterally deforms flanges 304 to permit passage of energy absorption portion 204. On full insertion, the inward edge 308 of each flange 304 rests on a transverse support ledge 236 of one of the side walls 230 of energy absorption portion 204. Outward removal of the pin 200 from clip 300 is resisted by the engagement of transverse support ledges 236 with inward edges 308 of flanges 304.

Also, at full insertion, the arcuate peripheral edges 216 of laterally extending arcuate webs 214 are in contact with the front surface of clip 300. Biasing webs 214 are deformed to provide a force urging pin 200 outward. Such force maintains the support ledges 236 in contact with inward edges 308 of flanges 304.

Assembled fasteners 100 are used to affix tabs 60 of a curtain airbag to vehicle body plates 50. First, energy absorption portion 204 of pin 200 along with longitudinal flanges 304 of clip 300 are longitudinally inserted through aperture 62 in a tab 60 until the inner or back surface of clip 300 overlies the outer or front surface of the tab 60. The laterally outward disposition of fingers 310 of flanges 304 causes the fingers to retain the tab 60 on pin 200.

The tab 60 is attached to body plate 50 by longitudinal insertion of energy absorption portion 204 of pin 200 through aperture 52 of a body plate 50. This position is illustrated in FIGS. 8 and 9. The fingers 310 of longitudinal flanges 304 are deformed laterally inward to permit passage through aperture 52. Longitudinal insertion continues until outward transverse edges 311 of fingers 310 surpass the inner or back surface of body plate 50. The fingers 310 then return to their unstressed condition with the edges 311 positioned longitudinally inward of the inner or back surface of body plate 50.

Insertion as described, causes further flexure of laterally extending webs 214 of head portion 202 increasing the restoring force urging the pin 200 outward. On release of the pin 200, the restoring force of webs 214 urges pin 200 outward bringing outward edges 311 of fingers 310 into contact with the inner or back surface of body plate 50. Fastener 100 is thus affixed to body plate 50 through longitudinal translation of pin 200. Tab 60 is captured between clip 300 and body plate 50.

Figure 11:
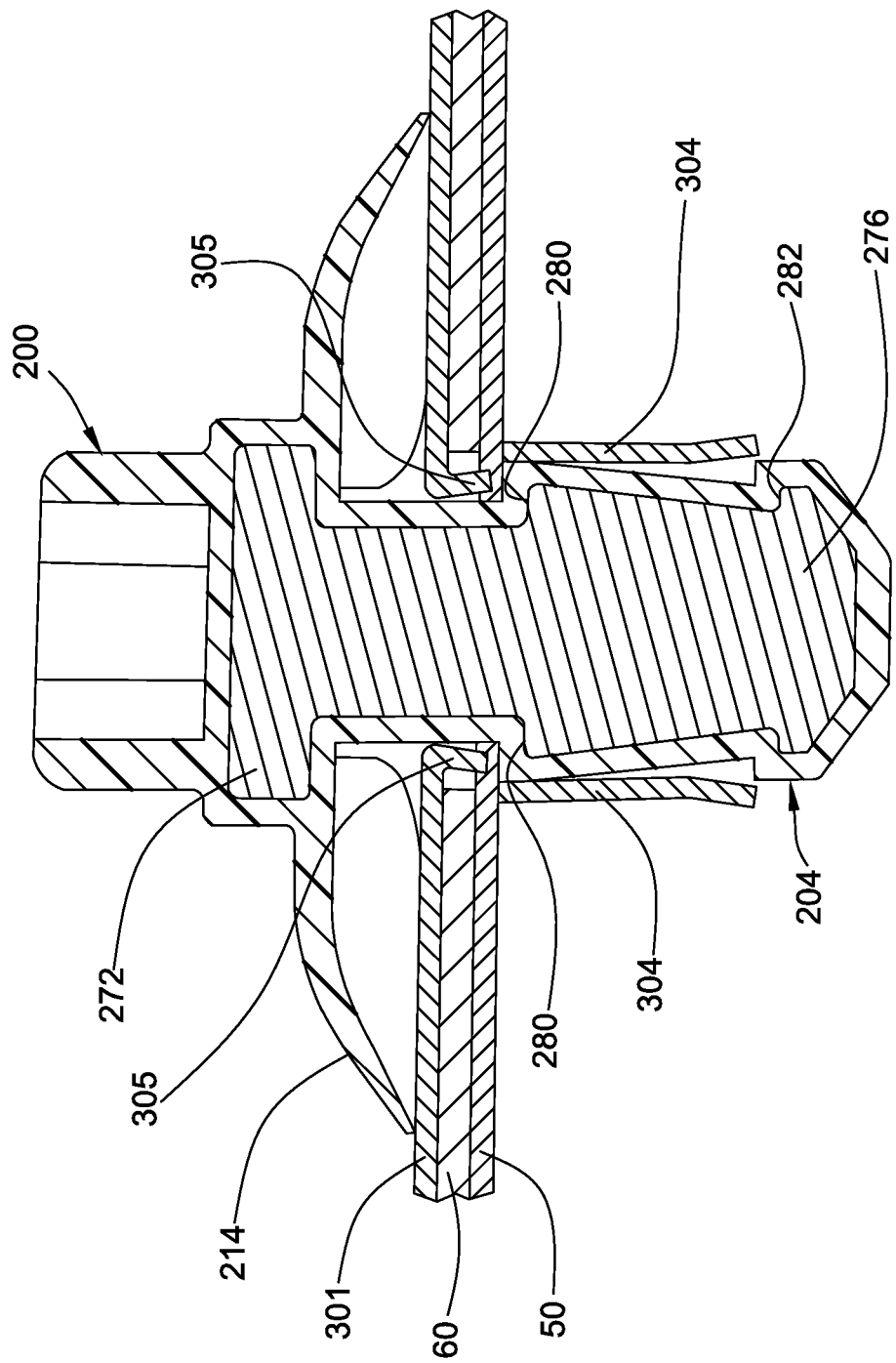
FIG. 11 is a sectional plan view of the energy absorbing rotatable fastener of FIG. 1 illustrating an installed energy absorbing position.

After installation of fastener 100 and clip 60 to a base plate 50, fastener 100 is rotatable clockwise into its energy absorption position by rotation of pin 200 through an angle of forty-five degrees (45°). These positions are illustrated in FIGS. 10 and 11. Notably, engagement of longitudinal stop edges 238 with edges of associated legs 307 of longitudinal flanges 304 prohibits rotation in the counterclockwise direction.

Pin 200 is manipulated manually, or using a tool, at head portion 202. To complete the installation, pin 200 is urged longitudinally inward until the planar transverse walls 234 of energy absorption portion 204 surpass transverse edges 314 of proximal wall portions 305 of longitudinal flanges 304 of clip 300. Pin 200 is then rotated until corners 233 of energy absorption portion 204 are positioned between longitudinal legs 307 of longitudinal flanges 304 which are urged transversely outward. In this position, actuating corners 233 at planar transverse walls 234 urge flanges 304 urge flanges 304 laterally outward and ultimately reside in the space defined by the transversely outward directed fingers 310 formed between longitudinal legs 307 and the distal wall portion 306 of longitudinal flanges 304 are spaced apart a distance wider than the width of the aperture 52 in body plate 50.

Figure 12:
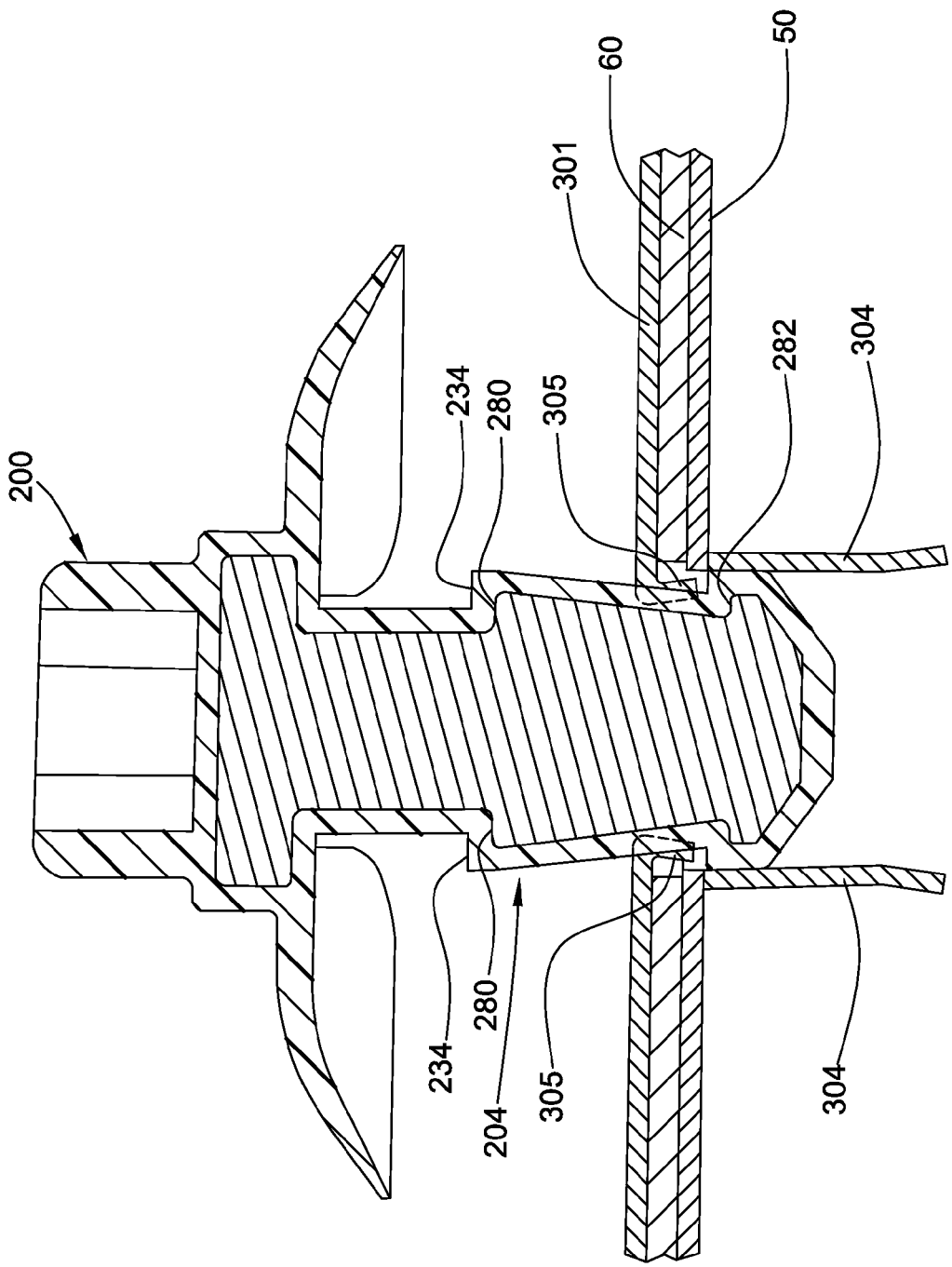
FIG. 12 is a sectional plan view of the energy absorbing rotatable fastener of FIG. 1 in a partially withdrawn position caused by deployment of the associated curtain air bag.

Release of the pin 200 permits the restoring force of laterally extending wings 214 to urge the planar transverse walls 234 longitudinally outward into abutting contact with transverse edges 314 of proximal wall portions 305 of flanges 304. This is the energy absorption position of fastener 200 as illustrated in FIGS. 11 and 12.

Such rotation also places the planar transverse surfaces 242 of energy absorption portion 204 in operative position to dissipate the energy of deployment of the curtain airbag. Planar transverse surfaces 242 at corners 232 of energy absorption portion 204 are disposed longitudinally inward of the inner or back surface of body plate 50. The diagonal orientation of the corners 232 positions planar transverse surfaces 242 diagonally midway between flanges 304, in abutting relation to the inner or back surface of body plate 50, to position the longitudinal energy absorbing structure of the energy absorption portion 204 against withdrawal in the longitudinally outward direction.

The capability of pre-assembly of pin 200 and clip 300 is significant to distribution of fasteners 100 to assembly operations and to convenience of use. The components of fastener 100, pin 200 and clip 300 are readily pre-assembled by the fastener manufacturer. The pre-assembled fasteners may be secured to tabs 60 of curtain air bags by longitudinal insertion. Such attachment can, for example, be accomplished by a manufacturer of curtain air bags, remote from vehicle assembly. Finally, installation of the curtain air bags may be accomplished by a vehicle manufacturer, again by longitudinal insertion of the pin 200 into body plates 60. Final affixation in the operative energy absorption position through forty-five degree (45°) rotation may be performed in a later, final assembly step.

Deployment of a curtain airbag causes violent outward forces to be imparted to the tabs 60. Tabs 60, in turn, impart outward force to the head end portion 272 of structural metal core 270 and result in outward urging of the structural metal core 270 including abutment ledges 280 and hook-like feet 282. These forces pull energy absorption portion 204 against the inner or back surface of body plate 50. Consequently, planar transverse surfaces 242 at corners 232 are urged forceably against the inner or back surface of body plate 50 to compress and deform, and possibly destroy the molded energy absorbing structure. The energy so imparted to the energy absorption portion is dissipated through deformation of the energy absorption portion 204. The structural metal core 270 retains the tabs 60 upon body plate 50 and the plastic deformation of the body of energy absorption portion 204 minimizes or eliminates delivery of destructive forces to the vehicle frame.

As can be understood by reference to FIGS. 11 and 12, longitudinal outward movement of the energy absorption portion 204 causes planar transverse walls 234 to deform and expose abutment edges 280 which push against proximal walls 305 of flanges 304 of clip 300. This action further provides additional energy absorption and retains the fastener 100 within the body plate 50. As seen in FIG. 12, in extreme longitudinal outward displacement of pin 200, hook-like feet 282 of structural metal core 270 provide additional securement by engagement with, and transverse displacement of, flanges 304.

Turning now to FIGS. 13 to 18, there is illustrated a modified form of energy absorbing rotatable fastener 150, in accordance with the disclosure, useful to affix tabs of a curtain air bag to the frame of a vehicle. As previously described and as seen in FIG. 1, the vehicle frame includes a plurality of spaced structural steel body plates 50, each provided with a rectangular body plate aperture 52. The body plates 50 are mounted to the frame with a void space behind the plate to accommodate the fastener.

The curtain air bag includes a plurality of structural steel hanger plates or tabs 60 each with a rectangular tab aperture 62 sized similarly to the aperture 52 of body plates 50. As in the previous embodiment, the fastener 150 of FIGS. 13 through 18 is longitudinally insertable through the tab aperture 62 and body aperture 52 along longitudinal axis of movement CL shown in FIG. 1. After such insertion, the fastener is rotated through an arc of forty-five degrees (45°) to affix the fastener and associated curtain air bag tab in place and operatively position the energy absorption elements of the fastener 150. On deployment of the curtain air bag, the energy absorption characteristic of the fasteners minimize the forces imparted to the vehicle frame.

Details of the fastener 150 are illustrated in FIGS. 13 through 18. Fastener 150 is comprised of two components, a clip 500 and a pin 400. The separate components are pre-assembled to form the unitary fastener 150 shown in FIGS. 15 and 16.

Figure 13:
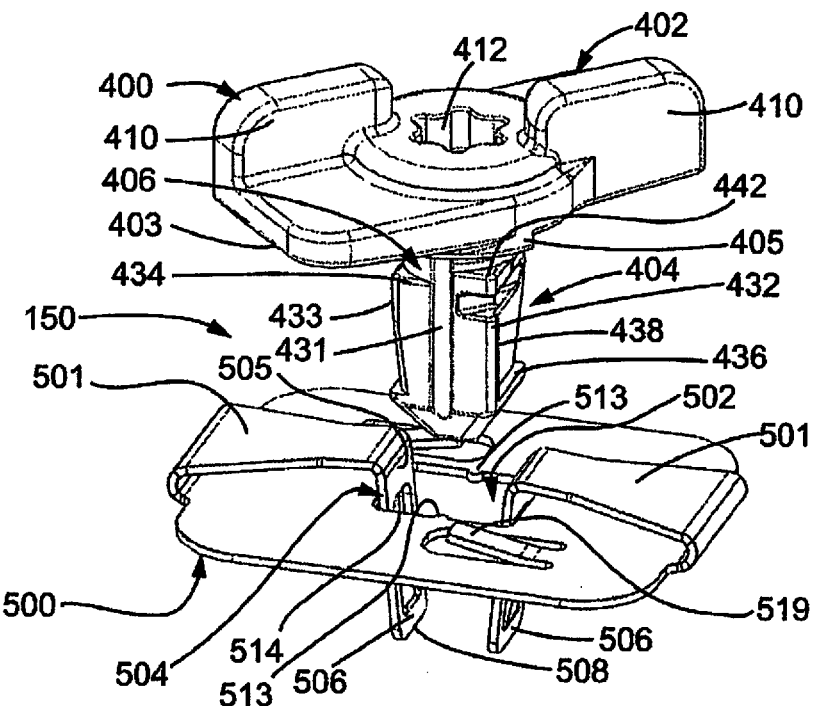
FIG. 13 is an exploded, perspective view, of a modified form of energy absorbing rotatable fastener in accordance with the present disclosure.
Figure 14:
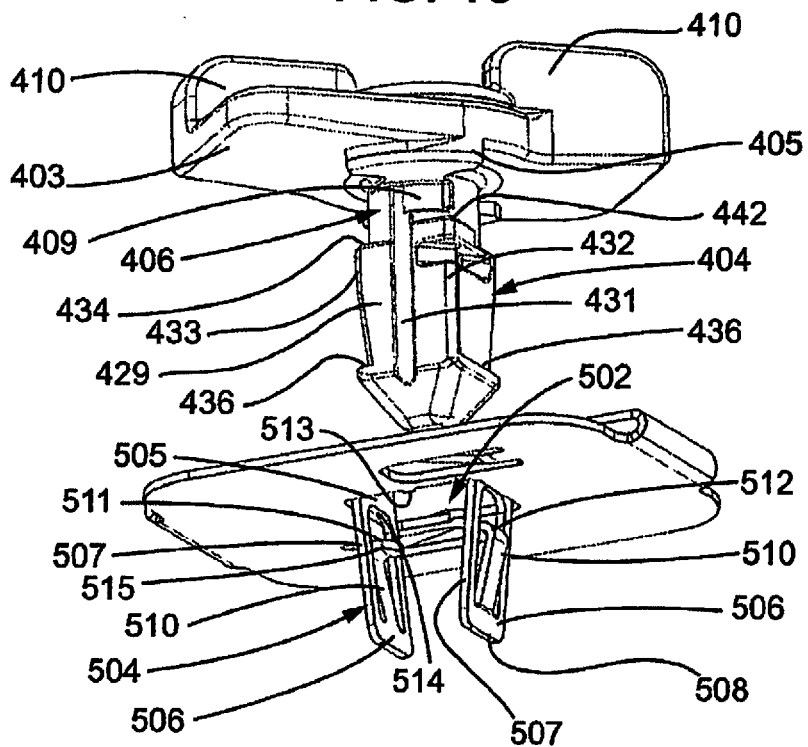
FIG. 14 is an exploded perspective view of the energy absorbing rotatable fastener of FIG. 13 as seen from a different view point.

The clip 500 seen in FIGS. 13 and 14 is a thin metal plate having a flat planar outward surface with a rectangular clip aperture 502. Integral biasing webs 501 extend from folds at opposite edges of clip 500 in overlying spaced relation to the front planar surface of clip 500 to form resilient compressible spring elements to urge the pin component 400 outwardly, as will be explained.

Webs 501 include free end portions extending inwardly through clip aperture 502, defining inwardly extending longitudinal flanges 504 along opposite edges of rectangular clip aperture 502.

Flanges 504 each have a proximal wall portion 505 and a distal wall portion 506 connected by longitudinal legs 507. Distal wall portion 506 has an inward edge 508. As seen in FIG. 14, the flanges 504 converge transversely inwardly toward each other.

Longitudinal central fingers 510 are cantilevered outwardly from distal wall portions 506. Fingers 510 are bent near their distal ends to define knuckles 512 and transverse contact surfaces 515, best seen in FIGS. 14-16. The fingers 510 diverge outwardly to an unstressed condition that places knuckles 512 transversely wider apart than the width of aperture 62 in tab 60 and aperture 52 in plate 50.

Edges of legs 507 and fingers 510 define open areas having an outward terminus at transverse edges 514 of proximal wall portions 505. The distal ends of fingers 510 define facing edges 511 positioned transversely inward between the flanges in the open areas.

As best seen in FIG. 13, the clip 500 includes two facing detents 517 centrally positioned along opposing edges of clip aperture 502. Detents 517 assist in orientation of the pin 400 during insertion as will be explained. Clip 500 also includes two outwardly directed upstanding cantilevered anti-rotation levers 519 which also cooperate with the pin 400 in the sequence discussed further below.

Referring to FIGS. 13 and 14, the pin 400 is a unitary molded polymeric structure with portions having separate functions. It includes a head, or manipulation portion 402, an energy absorption portion 404 and a transition portion connecting 406 head portion 402 and energy absorption portion 404.

The head portion 402 is larger than the rectangular apertures in clip 500, body plate 50 and tab 60. It includes manual grasp flanges 410 for longitudinal insertion and rotational affixation of the fastener 150 during attachment of the curtain airbag to a vehicle. It further includes a tool drive receptacle 412 which is illustrated as a hexagonal socket, but which could take any desired form to receive a manual, or powered drive tool.

Head portion 402 defines an inward facing planar surface 403. A pair of arcuate anti-rotation lugs 405 extends longitudinally inward from planar surface 403. Lugs 405 include clockwise stop 407 and counter-clockwise stop 408.

On insertion of pin 400 into aperture 502 of clip 500, inward planar surface 403 contacts the biasing webs 501 which, on deformation toward the outward surface of clip 500 create a restoring force to urge the pin 400 in the outward direction. This force, as will be explained, is utilized to retain pin 400 in its installed and its energy absorbing positions.

Transition portion 406 is generally cylindrical, and sized to rotate within the aperture 62 of tab 60, aperture 52 of body plate 50 and aperture 502 of clip 500. It permits rotation of the pin 400 to its operative position, securing tab 60 to body plate 50 and providing energy absorption capability. Transition portion 406 includes reliefs 409 seen in FIGS. 14 and 17.

The energy absorption portion 404 of pin 400 is best seen in FIGS. 13 to 16. It is of a square cross-section with two oppositely facing walls 429 and two oppositely facing walls 430 joined at diagonally opposed corners 432 and opposed corners 433. Corners 432 include a void space or notch 443 which defines a longitudinal energy absorbing structure commencing at an outward planar transverse surface 442 at each corner 432. Corners 433 are actuating corners and terminate at planar transverse surfaces 434 extending transversely to cylindrical transition portion 406.

Notches 443 includes a cam surface 444 that extends from each notch 443 to the surface of wall 430 at corner 433. The cam surfaces coact with facing edges 511 of fingers 510 to urge knuckles 512 transversely outward as explained further below.

The two oppositely facing walls 429 are generally planar in the direction of insertion. Each includes a longitudinal center groove 431 parallel to the axis of insertion which terminates in relief 409.

The two opposed side walls 430 of energy absorption portion 404 include recesses to create transverse support ledges 436 and longitudinal stop edges 438 adjacent opposite corners 432. Pin 400 is positioned in clip aperture 502 with opposed side walls 430 aligned with and facing the opposed flanges 504. Detents 517 on opposing edges of the clip aperture 502 are disposed in grooves 431 in side walls 429 and assure proper orientation of the pin 400 and clip 500 such that a forty-five degree (45°) clockwise rotation of the pin 400 places pin 400 in its energy absorbing position.

Planar transverse walls 434 at corners 433 extend to cylindrical transition portion 406 at corners 433. On rotation of the pin 400 to its energy absorption position, actuating corners 433 urge the flanges 504 laterally outward and planar transverse walls 434 are disposed in abutting relation to the transverse edges 514 of proximal walls 505 of longitudinal flanges 504 of clip 500 as will be discussed further.

When pin 400 is rotated to its energy absorption position, outward planar transverse surfaces 442 are disposed in abutting relation to the inner or back surface of body plate 50. The longitudinal energy absorbing structure at corners 432 comprise the initial energy absorbing element of the fastener in the event of deployment of the curtain airbag.

The head portion 402 of pin 400 is sized to retain the curtain air bag to the vehicle frame under conditions of air bag deployment. The forces associated with such deployment are dissipated by the energy absorption portion 404. However, it is important that the curtain air bag structure be retained to the vehicle body frame which is assured.

Unlike the embodiment of FIGS. 1 to 12, the pin 400 does not include a structural metal core. The molded pin 400 and clip 500 provide the energy absorption capability, particularly the longitudinal energy absorbing structure at corners 432 and the fingers 510 at knuckles 512. This embodiment could include a structural metal core should the requirements of the application dictate.

Figure 15:
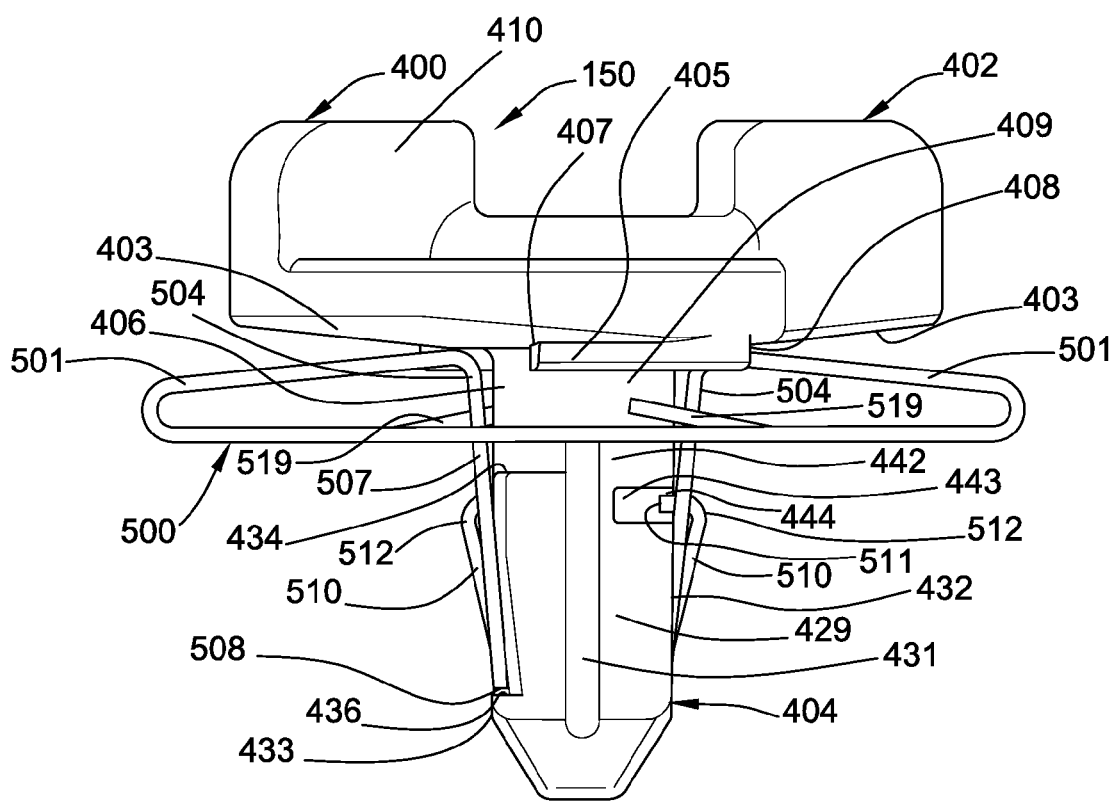
FIG. 15 is a side view of the energy absorbing rotatable fastener of FIGS. 13 and 14 in its assembled condition.
Figure 16:
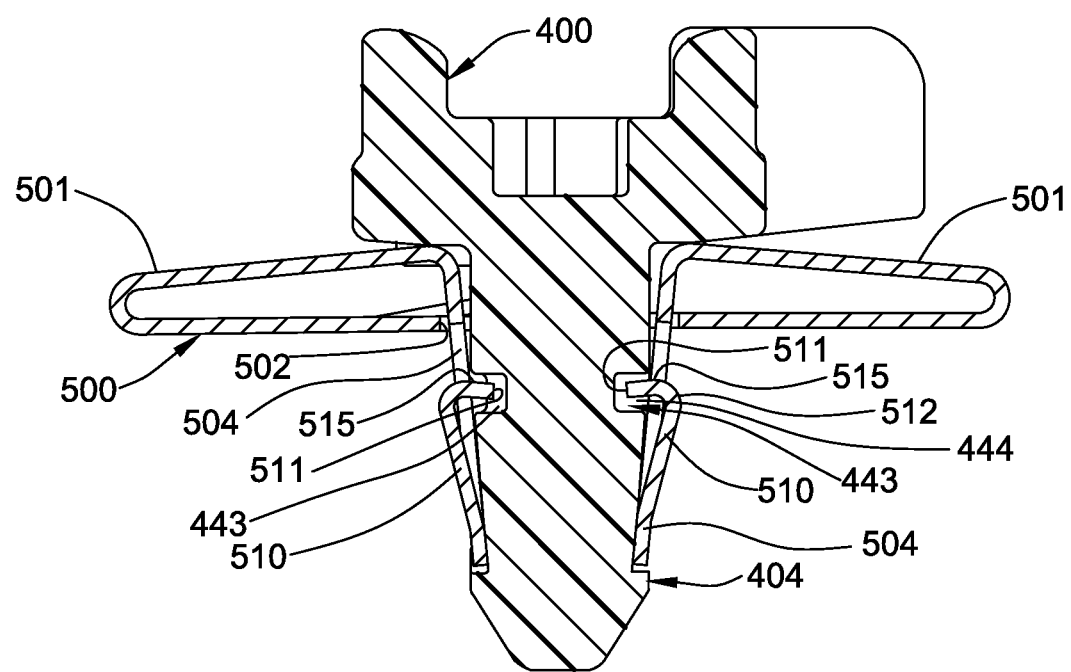
FIG. 16 is a sectional view of the assembled energy absorbing rotatable fastener shown in FIG. 15.

The pin 400 and clip 500 are preassembled to form completed fastener 150 seen in FIG. 15. Energy absorption portion 404 is inserted longitudinally through clip aperture 502. Such insertion deforms flanges 504 laterally to permit passage of energy absorption portion 404. On full insertion, the inward edge 508 of each flange 504 rests on a transverse support ledge 436 of one of the side walls 430 of energy absorption portion 404. Outward removal of the pin 400 from clip 500 is resisted by the engagement of transverse support ledges 436 with inward edges 508 of flanges 504.

Also, at full insertion, the resilient compressible biasing webs 501 are depressed inward toward the top surface of clip 500 to provide a force urging pin 500 outward. Such force maintains the support ledges 436 in contact with inward edges 508 of flanges 504.

Assembled fasteners 150 are used to affix tabs 60 of a curtain airbag to vehicle body plates 50. First, energy absorption portion 404 of pin 400 along with longitudinal flanges 504 of clip 500 are longitudinally inserted through aperture 62 in a tab 60 until the inward surface of clip 500 overlies the outward surface of the tab 60. The laterally outward disposition of knuckles 512 of fingers 510 retains the tab 60 on pin 400. Notably, there is sufficient spacing in notches 443 such that on insertion of the flanges 504 through tab aperture 62, the knuckles 512 flex laterally inward to pass through the aperture 62.

The tab 60 is attached to body plate 50 by longitudinal insertion of energy absorption portion 404 of pin 400 along with longitudinal flanges 504 of clip 500 through aperture 52 of body plate 50. Again, the fingers 510 of longitudinal flanges 504 are flexed or deflected laterally inward to permit passage through aperture 52 of body plate 50. Longitudinal insertion continues until knuckles 512 of fingers 510 surpass the inward surface of body plate 50. The fingers 510 then return to their unstressed condition with the contact surfaces 515 positioned longitudinally inward of the inward surface of body plate 50.

Insertion as described, causes further flexure of biasing spring elements or biasing webs 501 increasing the restoring force urging the pin 400 outward. On release of the pin 400, the restoring force of biasing webs 501 urges pin 400 longitudinally outward until contact surfaces 515 of fingers 510 contact the inward or back surface of body plate 50. Fastener 150 is thus affixed to body plate 50 through longitudinal translation of pin 400. Tab 60 is affixed to body plate 50 because it is captured between clip 500 and body plate 50.

After installation of fastener 150 and clip 60 to a body plate 50, fastener 150 is rotatable clockwise into its energy absorption position by rotation of pin 400 through an angle of forty-five degrees (45°). Notably, engagement of longitudinal stop edges 438 of side walls 430 of energy absorption portion 404 with edges of legs 507 of longitudinal flanges 504 prohibits rotation in the counter-clockwise direction.

To complete the installation, pin 400 is manipulated manually, or using a tool, at head portion 402. Pin 400 is urged longitudinally inward until the planar transverse walls 434 of energy absorption portion 404 surpass transverse edges 514 of proximal wall portions 505 of longitudinal flanges 504 of clip 500. At this longitudinal inward position, the detents 517 exit the longitudinal center grooves 431 in facing walls 429. Reliefs 409 of transition portion 406 permit passage of detents 517 on clockwise rotation of pin 400. Pin 400 is then rotated until corners 433 of energy absorption portion 404 are positioned between longitudinal legs 507 of longitudinal flanges 504 which are urged transversely outward. Cam surfaces 444 in notches 443 engage contact surfaces 515 at the distal ends of fingers 510 and urge them transversely outward. Also, actuating corners 433 at planar transverse walls 434 move into the space defined by the transversely outward directed fingers 510 between longitudinal legs 507 and urge the facing transverse contact surfaces 511 of fingers 510 as well as knuckles 512 transversely outward. This action moves the knuckles 512 and the transverse contact surfaces 511 of fingers 510 laterally further apart and increases interference with the back surface of body plate 50. The transverse contact surfaces 511 of fingers 510 and knuckles 512 are thus placed in an energy absorption position as will be understood.

Figure 17:
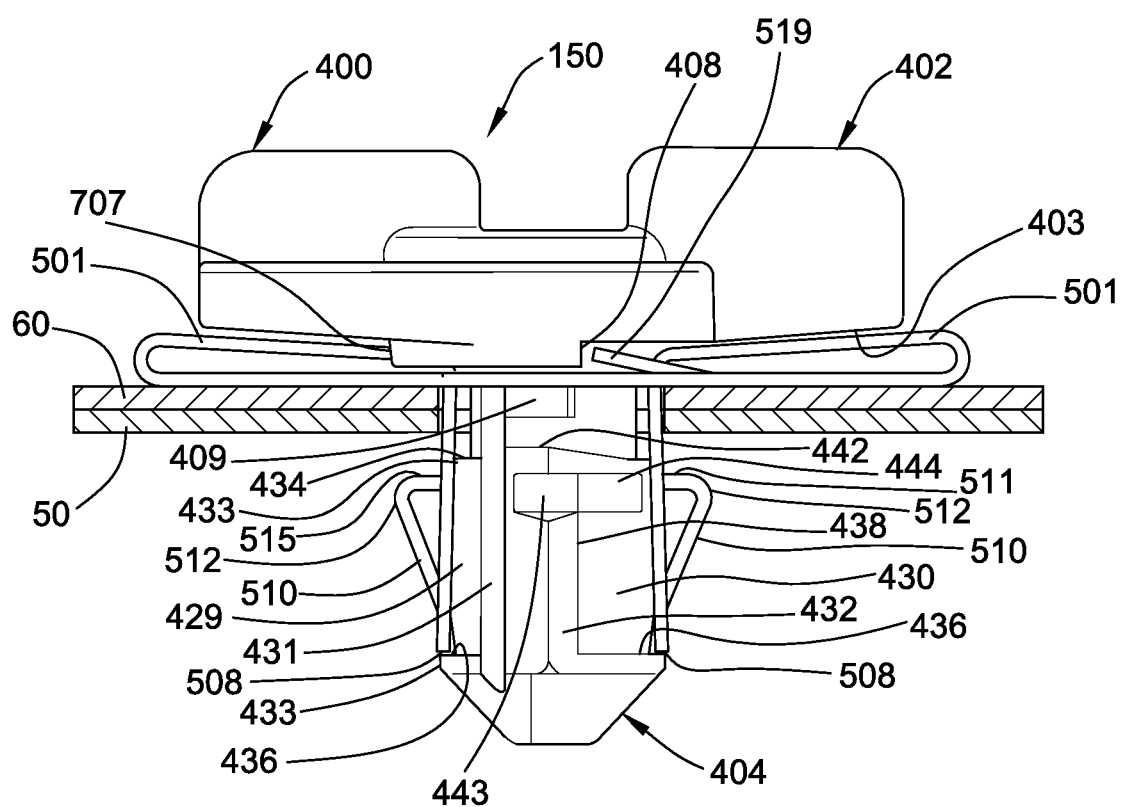
FIG. 17 is a side view of the energy absorbing rotatable fastener of FIG. 15 in its locked, and energy absorbing position connecting a tab of a curtain air bag to a vehicle body plate.

Release of the pin 400 permits the restoring force of integral biasing webs 501 to act against inward planar surface 403 of head portion 402 to urge the planar transverse walls 434 longitudinally outward into abutting contact with transverse edges 511 of proximal wall portions 505 of flanges 504. This is the energy absorption position of fastener 400 as illustrated in FIG. 17. Rotation of the pin 400 clockwise is limited by abutting contact of clockwise stop 407 with the edge of integral biasing webs 501. This limit assures that the pin 400 is accurately positioned in its energy absorbing position. Also, as seen in FIG. 17, rotation of pin 400 through an arc of 45° moves counter-clockwise stop 408 beyond anti-rotation levers 519 of clip 500. Stops 408 and anti-rotation levers 519 coact to prevent counter-clockwise movement of pin 400 relative to clip 500 and the pin is thus locked in its energy absorption position.

Rotation of pin 400 this position also places the energy absorption portion 404 in operative position to dissipate the energy of deployment of the curtain airbag. Planar transverse surfaces 442 at corners 432 of energy absorption portion 404 are disposed longitudinally inward of the inward surface of body plate 50. The diagonal orientation of the corners 432 positions planar transverse surfaces 442 diagonally midway midway between flanges 504 in abutting relation to the inward surface of body plate 50, to position the longitudinal energy absorbing structure of the energy absorption portion 404 against withdrawal in the longitudinally outward direction.

Deployment of a curtain airbag causes violent outward forces to be imparted to the tabs 60. Tabs 60, in turn, impart outward force to the head portion 402 and result in outward pulling of energy absorption portion 404 against the inward or back surface of body plate 50. Consequently, planar transverse surfaces 442 at corners 432 are urged forceably against the inward surface of body plate 250 to compress and deform, and possibly destroy the molded energy absorption portion 404. The energy so imparted to the energy absorption portion is dissipated through deformation of the energy absorption portion 404 of pin 400. The plastic deformation of the body of energy absorption portion 404 minimizes or eliminates delivery to the vehicle frame of destructive forces.

Figure 18:
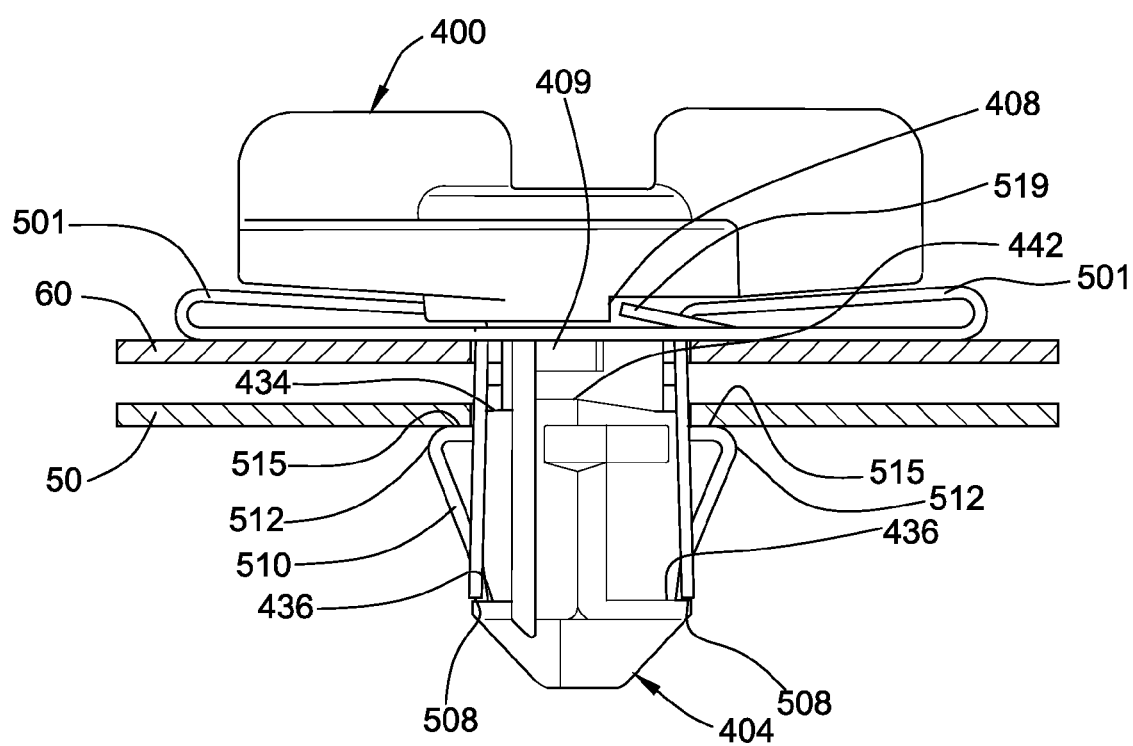
FIG. 18 is a side view of the energy absorbing rotatable fastener of FIG. 15 showing the position of the fastener after an air bag deployment.

As can be understood by reference to FIG. 18, longitudinal outward movement of the energy absorption portion 404 causes transverse contact surfaces 511 of fingers 510 to engage the back surface of body plate 50. Further energy of the airbag deployment is absorbed by deformation of fingers 510.

The capability of pre-assembly of pin 400 and clip 500 is significant to distribution of fasteners 300 to assembly operations and to convenience of use. The components of fastener 300, pin 400 and clip 500 are readily pre-assembled by the fastener manufacturer. The pre-assembled fasteners may be secured to tabs 60 of curtain air bags by longitudinal insertion. Such attachment can, for example, be accomplished by a manufacturer of curtain air bags, remote from vehicle assembly. Finally, installation of the curtain air bags may be accomplished by a vehicle manufacturer, again by longitudinal insertion of the pin 400 into body plates 60. Final affixation in the operative energy absorption position through forty-five degree (45°) rotation may be performed in a later final assembly step.

FIGS. 19 to 22 show a modified form of energy absorbing rotatable fastener 175. It includes a pin 600 for use in combination with a clip 700 identical to clip 500 of the embodiment of FIGS. 13 to 18.

In this regard, pin 600 is a molded polymeric structure. It includes a head portion 602 and an energy absorption portion 604 identical to the pin 400 of the previous embodiment. Pin 600 coacts with clip 700 in the same manner as the pin 400 and clip 500 of the embodiment of FIGS. 13 to 18 for securement of a curtain air bag tab to a vehicle body plate such as the tab 60 and body plate 50 illustrated in FIG. 1. When so connected the fastener 175 provides the same retention, and energy absorption capability as the fastener 150 illustrated in FIGS. 13 to 18.

The pin of FIGS. 19 to 22 provides a capability of utilization with powered installation tools. To achieve this capability it is necessary to accommodate rotation of the installation tool through an arc of at least ninety degrees (90°). This is accomplished by providing a drive cap 800 converts the drive tool action into a pin rotation of forty-five degrees (45°). That provides for 90° of last rotation before driving engagement with pin 700 in the cap 800.

Referring to FIGS. 19 to 22 head portion 602 of pin 600 is enlarged, but generally circular about the longitudinal axis CL: of the pin 600. It is sized larger than the rectangular aperture 62 of tab 60 and rectangular aperture 52 of body plate of body plate 50. Head portion 602 includes an inward planar surface 603 that coacts with integral biasing webs 701 of clip 700. In the same manner that inward planar surface 403 coacts with biasing webs 501 of clip 500 of the embodiment of FIGS. 13 to 18.

Head portion 600 includes a planar annular peripheral rim surface 620 with two longitudinally outward projections 622 located one-hundred eighty degrees (180°) apart. Radially inward of rim surface 620 is an integral annular ring 624.

It includes a longitudinal outer cylindrical surface that includes two radial projections 625 positioned one-hundred eighty degrees (180°) apart. Each has a retention surface facing toward, but spaced from planar circular rim surface 620. Ring 624 further includes a longitudinal inner cylindrical surface 626 that defines a central void space. Within this void space, the inner cylindrical surface includes a pair of arcuate drive blocks 627 that extend radially inward. Each drive block includes a drive block face 628 which are positioned one-hundred eighty degrees (180°) apart.

Drive cap 800, best seen in FIGS. 21 and 22, is generally cylindrical and symmetrical about longitudinal axis CL: It includes a planar top wall 802 provided with a central tool drive receptacle 812 suitably shaped to be engaged by a drive tool, such as a sprocket-shaped bit.

Drive cap 800 includes peripheral webs 803 depending from top wall 802 and joined by arcuate rim segments 804. Rim segments 804 and top wall 802 define arcuate slots 805. The outer perimeter of the peripheral webs 803 and rim segments 804 is generally the same size as the outer perimeter of the head portion 602 at planar circular rim surface 620. Peripheral webs 803 include depending feet 807 spaced one-hundred eighty degrees (180°) apart. Two sets of spaced apart depending feet 808 are located on rim segments 804 midway between peripheral webs 803.

The interior of drive cap 800 includes central annular ring 810 which defines tool drive receptacle 812. It includes a cylindrical wall 814 which contains a pair of radially outwardly located driving lugs 816 each having driving surface 818 spaced one-hundred eighty degrees (180°) from the driving surface of the other lug 816.

The assembled head portion 602 of pin 600 is shown in FIG. 19. The drive cap 800 is retained on the head portion 602 by disposition of radial projections 625 within slots 805 between rim segments 804. Peripheral webs 803 are sufficiently flexible to be deformed to position the projections 625 within the slots 805. The projections 625 extend radially outward, and overlie rim segments 804, capturing them between the projections and the planar annular rim surface 620 on head portion 602. Depending feet 807 and the pairs of spaced feet 808 are slidably supported on planar annular rim surface 620 for rotational movement of drive cap 800 relative to head portion 602 of pin 600. Such movement is limited to an arc defined by the arcuate extent of lots 805.

Movement of drive cap 800 is initiated by rotation of the drive cap 800 by a drive tool in tool drive receptacle 812. On initiation of rotation effort, the pairs of spaced feet 808 readily disengage from radial projections 625 on planar annular rim surface 620 to permit arcuate rotation of drive cap 800 relative to pin 600.

The center annular ring 810 is disposed within the void space of head portion 602 defined by integral annular ring 624 of head portion 602. The drive lugs 816 of drive cap 806 are positioned to engage drive blocks 627 of head portion 602 at drive block faces 628.

The drive cap 800 and head portion 602 are initially assembled with the pair of spaced feet 808 positioned in engaged relation with outward projections 622 on annular peripheral rim surface 620. This circumferential orientation places the driving lug surface 818 of driving lugs 816 in arcuate distance of ninety degrees (90°) from the drive block faces 628 of drive blocks 627 of end portion 602 of pin 600.

Drive cap 800 must rotate an arc of ninety degrees (90°) before driving engagement is established with pin 600, thus providing ninety degrees (90°) of lost motion before pin 600 rotates relative to its associated clip 700. The pin 600 is then rotated forty-five degrees (45°) to its energy absorbing position by the drive tool. The inherent lost motion permits use of conventionally available powered tools at vehicle assembly plants. Once positioned in its energy absorbing position, pin 600 functions to secure curtain air bag tab, such as tab 60 to a body plate 50 and provide the essential energy absorption capability in the event of an air bag deployment.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

The invention claimed is:

1. An energy absorbing rotatable fastener comprising:
   a clip including:
   an outward planar surface with a rectangular aperture therein;
   flanges extending inwardly of said outward planar surface at opposite edges of said rectangular aperture;
   a longitudinally elongate pin comprising:
   a manipulation portion;
   an energy absorption portion inserted longitudinally through said clip aperture having a generally square cross-section defining walls joined at corners,
   at least one of said corners defining energy absorbing elements,
   said pin disposed in said clip aperture releasably connected to said clip at said flanges and rotatable relative to said clip to position said energy absorbing elements in an energy absorption position.

2. An energy absorbing rotatable fastener as claimed in claim 1 wherein
   one of said clip and pin define biasing webs urging said pin longitudinally outward of said clip, said webs compressible on inward longitudinal insertion of said clip to provide a restoring force to urge said pin outwardly of said aperture of said clip.

3. An energy absorbing rotatable fastener as claimed in claim 2 wherein two of said corners of said energy absorption portion comprise energy absorbing elements.

4. An energy absorbing rotatable fastener as claimed in claim 3 wherein on compression of said biasing webs said pin is rotatable forty-five degrees)(45°) to place said energy absorbing elements diagonally midway between said flanges of said clip.

5. An energy absorbing rotatable fastener as claimed in claim 4 wherein said flanges of said clip include a distal wall with inwardly directed fingers that each define a knuckle and a transverse contact surface and said fingers diverge outwardly and in an unstressed condition place said knuckles transversely wider apart than said flanges.

6. An energy absorbing rotatable fastener as claimed in claim 5 wherein said fingers of said flanges define facing edges positioned between said flanges and wherein said energy absorption portion of said pin includes two actuating corners that contact said facing edges of said fingers on rotation of said energy absorption portion to said energy absorption position and urge said knuckles laterally outward to an energy absorption position.

7. An energy absorbing rotatable fastener as claimed in claim 6 wherein said clip includes said biasing webs, said clip further defining at least one outwardly directed upstanding anti-rotation lever and wherein said manipulations portion of said pin includes an inward facing planar surface that coacts with said integral biasing webs of said clip, said manipulation portion further includes at least one anti-rotation lug defining a counter-clockwise stop coacting with said at least one outwardly directed upstanding anti-rotation lever of said clip to limit rotation of said pin relative to said clip in a counter-clockwise direction.

8. An energy absorbing rotatable fastener as claimed in claim 7 wherein said at least one anti-rotation lug of said manipulation portion of said pin defines a stop coacting with one of said biasing webs to limit rotation of said pin in a clockwise direction.

9. An energy absorbing rotatable fastener as claimed in claim 2 wherein said clip includes integral webs extending from folds at opposite edges of said clip in overlying spaced relation to the outward planar surface thereof and said webs include free ends defining said flanges of said clip.

10. An energy absorbing rotatable fastener as claimed in claim 2 wherein:
    said flanges of said clip include an inward transverse edge, and
    said walls of said energy absorption portion include at least one wall having a transverse support ledge with said inward transverse edge of at least one of said flanges engaging one of said ledges.

11. An energy absorbing rotatable fastener as claimed in claim 10 wherein two opposed walls of said energy absorption portions have a transverse support ledge with the transverse edge of each of said flanges engaging one of said edges.

12. An energy absorbing rotatable fastener as claimed in claim 10 wherein said walls of said energy absorption portions include at least one wall having a longitudinal stop edge engaging an edge of one of said flanges to resist rotation of said pin.

13. An energy absorbing rotatable fastener as claimed in claim 4 wherein said manipulation portion includes a generally cylindrical head portion and a separate drive cap rotatably supported thereon, said drive cap including a tool drive receptacle and is rotatable relative to said head portion in an arc of ninety degrees)(90°).

14. An energy absorbing rotatable fastener as claimed in claim 13 wherein said manipulation portion of said pin includes at least one drive block defining a drive block face and said drive cap includes at least one driving lug having a driving surface and wherein said driving surface of said driving lug and said drive block face are initially positioned an arcuate distance apart of ninety degrees (90°).

15. An energy absorbing rotatable fastener as claimed in claim 4 wherein said pin is a molded polymeric structure and includes an internal metal core.

16. An energy absorbing rotatable fastener as claimed in claim 2 wherein said manipulation portion includes laterally extending opposed wings defining said biasing webs wherein said webs include peripheral edges in contact with said outward planar surface of said clip and provide said restoring force to urge said pin outwardly of said aperture of said clip.

17. An energy absorbing rotatable fastener as claimed in claim 16 wherein said clip includes a machine readable indicia on said outward planar surface, said manipulation portion of said pin obscuring said indicia when said pin is in its initially inserted position and exposing said indicia when said pin is rotated relative to said clip to said energy absorption position.

18. A method of attaching a tab having a rectangular aperture therein to a base plate having a rectangular aperture therein using an energy absorbing rotatable fastener comprising:
   a clip including:
   an outward planar surface with a rectangular aperture therein;
   flanges extending inwardly of said outward planar surface at opposite edges of said rectangular aperture;
   a longitudinally elongate pin comprising:
   a manipulation portion;
   an energy absorption portion inserted longitudinally through said clip aperture having a generally square cross-section defining walls joined at corners;
   at least one of said corners defining energy absorbing elements,
   said pin disposed in said clip aperture releasably connected to said clip at said flanges and rotatable relative to said clip to position said energy absorbing elements in an energy absorption position,
   the method comprising:
   inserting said flanges of said clip and said energy absorption portion of said pin through said aperture in said tab and said aperture in said base plate,
   rotating said pin relative to said clip to position said energy absorbing elements in an energy absorption position behind a back surface of said body plate.

19. A method of attaching a tab to a base plate as claimed in claim 18, wherein
   one of said clip and pin define biasing webs urging said pin longitudinally outward of said clip, said webs compressible on inward longitudinal insertion of said clip to provide a restoring force to urge said pin outwardly of said aperture,
   wherein two of said corners of said energy absorption portion comprise energy absorbing elements and two of said corners comprise actuating corners,
   wherein on compression of said biasing webs, said pin is rotatable forty-five degrees) (45°) to place said energy absorbing elements diagonally midway between said flanges of said clip,
   said method further comprising urging said pin longitudinally inward and rotating said energy absorption portion through an angle of forty-five degrees)(45°) to position said energy absorbing elements in said energy absorption position.

20. A method of attaching a tab to a base plate as claimed in claim 19, wherein
   said flanges of said clip include a distal wall with inwardly directed fingers that each define a knuckle and a transverse contact surface and said fingers diverge outwardly and in an unstressed condition place said knuckles transversely wider apart than said flanges,
   wherein said fingers of said flanges define facing edges positioned between said flanges and wherein said energy absorption portion includes two corners that contact said facing edges of said fingers on rotation of said energy absorption portion to said energy absorption position,
   said method comprising rotating said pin to contact said two actuating corners with said facing edges of said fingers to urge said knuckles laterally outward positioning said transverse contact surfaces of said fingers behind the back surface of said base plate to an energy absorption position.

* * * * *